US009843268B2

United States Patent
Ku et al.

(10) Patent No.: US 9,843,268 B2
(45) Date of Patent: *Dec. 12, 2017

(54) POWER FACTOR CORRECTION DEVICE AND CORRECTING METHOD THEREOF

(71) Applicant: Alpha and Omega Semiconductor (Cayman) Ltd., Sunnyvale, CA (US)

(72) Inventors: Chung-Ping Ku, Taipei (TW); Wei-Chi Huang, Taipei (TW)

(73) Assignee: ALPHA AND OMEGA SEMICONDUCTOR (CAYMAN) LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,567

(22) Filed: Apr. 9, 2014

(65) Prior Publication Data

US 2014/0218990 A1  Aug. 7, 2014

Related U.S. Application Data

(63) Continuation of application No. 13/408,077, filed on Feb. 29, 2012, now Pat. No. 8,716,985.

(51) Int. Cl.
| | |
|---|---|
| *G05F 5/00* | (2006.01) |
| *H02M 7/06* | (2006.01) |
| *H02M 1/42* | (2007.01) |

(52) U.S. Cl.
CPC ......... *H02M 7/066* (2013.01); *H02M 1/4225* (2013.01); *Y02B 70/126* (2013.01)

(58) Field of Classification Search
CPC .............................. H02M 1/4225; H02M 7/066

USPC ....... 323/207, 284, 205, 283, 222, 208, 210, 323/266, 288, 234, 282; 363/89, 44, 84,
(Continued)

(56) References Cited

U.S. PATENT DOCUMENTS 5,764,039 A * 6/1998 Choi ................... H02M 1/4225
                                                    323/222
6,178,104 B1 * 1/2001 Choi ................... H02M 1/4225
                                                    323/222
(Continued)

*Primary Examiner* — Adolf Berhane
*Assistant Examiner* — Afework Demisse
(74) *Attorney, Agent, or Firm* — Lance Ang Li; Chein-Hwa S. Tsao; Chen-Chi Lin

(57) ABSTRACT

A power factor correction device comprises a power stage circuit converting input alternating current voltage into input current according to a pulse width modulation signal and outputs the input current to a load generating output voltage on the load, and sampling the input current outputting a correcting current; a current compensating circuit receiving and comparing the correcting current with a reference current signal generating a compensating current signal; a voltage compensating circuit receiving and comparing the output voltage with a reference voltage generating a compensating voltage signal; a multiplication amplifier receiving the compensating current signal and the compensating voltage signal generating an updated reference current signal by multiplying the compensating current signal with the compensating voltage signal; and a pulse width modulation converter receiving the compensating current signal and the compensating voltage signal generating the pulse width modulation signal to synchronize phase of alternating current voltage and input current.

19 Claims, 6 Drawing Sheets

(58) Field of Classification Search
USPC .......... 363/126, 74, 21.01, 37, 97, 98, 127, 363/21.08, 21.16, 21.17, 70, 90, 15, 17
See application file for complete search history.

(56) References Cited

U.S. PATENT DOCUMENTS

| | | | |
|---|---|---|---|
| 8,716,985 B2* | 5/2014 | Ku | H02M 7/066 323/207 |
| 2011/0211375 A1* | 9/2011 | Uno | H02M 1/4225 363/74 |

* cited by examiner

POWER FACTOR CORRECTION DEVICE AND CORRECTING METHOD THEREOF

CROSS REFERENCE TO RELATED APPLICATIONS

This application is a continuation application of a pending US patent application entitled "POWER FACTOR CORRECTION DEVICE AND CORRECTING METHOD THEREOF" application Ser. No. 13/408,077, filing date: Feb. 29, 2012, inventor Chung-Ping Ku. The above contents are incorporated herein by reference for any and all purposes.

FIELD OF THE INVENTION

The invention relates to power factor correction (PFC) devices, in particular to a power factor correction device for PFC Boost converters.

BACKGROUND OF THE INVENTION

Nowadays, high-quality power supplies with increasing energy efficiency are in high demand. Power factor correction technique plays an important role in improving the electric power supply efficiency of electric appliances, which are usually inductive loads that cause the current and voltage out of phase leading to low energy efficiency. A power factor corrector synchronizes the phases of the input voltage and the input current of an electric appliance, namely, the load of the electric appliance is adapted similar to a resistance-type load, thus harmonic distortion of the input current is effectively reduced resulting in high power factor of power supply.

A common power factor correction device requires a pulse width modulation (PWM) signal generator to provide a pulse width modulation (PWM) signal and a sample of an input voltage as a reference signal for correcting the current. In the conventional technologies, for example, the pulse width modulation signal generator disclosed by U.S. Pat. No. 5,886,586 does not require the input voltage sample but uses an integrator to perform one-cycle (i.e., feed-forward) control method to decide charge-discharge time and electric potential of an integrated capacitor. Other US patents, such as U.S. Pat. Nos. 7,068,016 and 5,804,950, also disclose similar technologies. However, the above patents using the integrator or the integrated capacitor in or out of a circuit, as such the response speed of the internal circuit is greatly reduced during the operation. In addition, the circuit is internally provided with a switch for discharging the integrated capacitor; therefore, power consumption is increased and the circuit space is enlarged.

Hence, the invention provides a power factor correction device and a correcting method thereof to solve the above problems.

SUMMARY OF THE INVENTION

The present invention provides a power factor correction device and a correcting method. The current compensating circuit and the voltage compensating circuit are connected to a multiplier to multiply the compensating voltage signal by the compensating current signal to generate an updated reference current signal. The updated reference current signal is provided to the current compensating circuit to perform power factor correction. The device and method of the present invention can avoid the use of the integrated capacitor, therefore the response speed of the internal circuit is greatly increased during operation, thus power factor correcting efficiency is improved.

To achieve the above purpose, the present invention provides a power factor correction device, which comprises a power stage circuit. The power stage circuit, which is connected to a load, receives an input alternating current (AC) voltage and a pulse width modulation signal. The input alternating current voltage is converted into an input current in accordance with the pulse width modulation signal via the inductor, the power diode and the power transistor, which are driven by the pulse width modulation signal. The input current is output to the load, which produces an output voltage on the load. The power stage circuit samples the input current through the sample resistor as a correcting current. The power stage circuit is connected to the current compensating circuit that receives error between the correcting current and the reference current signal, thus a compensating current signal is generated through the current error amplifier and the current compensator. The power stage circuit is also connected to the voltage compensating circuit and the error between the output voltage and a reference voltage is received by the voltage divider, thus, a compensating voltage signal is generated by the voltage error amplifier and the voltage compensator. The outputs of the current compensating circuit and the voltage compensating circuit are connected with a multiplication amplifier that receives the compensating current signal and the compensating voltage signal, thus an updated reference current signal is generated after multiplying the compensating current signal by the compensating voltage signal. The current compensating circuit and the voltage compensating circuit are connected to a pulse width modulation converter that receives the compensating current signal and the compensating voltage signal to generate the updated pulse width modulation signal and to obtain the same phases of the alternating current voltage and the input current.

The present invention also provides a power factor correcting method. First the correcting current and output voltage is compared to a reference current signal and a reference voltage respectively generating a compensating current signal and a compensating voltage signal through the current compensating circuit and the voltage compensating circuit, as such an updated pulse width modulation signal is generated and same phases of the alternating voltage and the input current are obtained. An updated reference current signal is obtained by multiplying the compensating current signal with the compensating voltage signal through the multiplication amplifier. Finally, the updated pulse width modulation signal is generated from the compensating current signal and the compensating voltage signal and the same phases of the alternating current voltage and the input current are achieved.

BRIEF DESCRIPTION OF THE DRAWINGS

As shown in attached drawing, the embodiment of the invention is more sufficiently described. However, the attached drawing is only used for explanation and illustration rather than limitation to the scope of the invention.

DETAILED DESCRIPTION OF THE EMBODIMENTS

Figure 1:
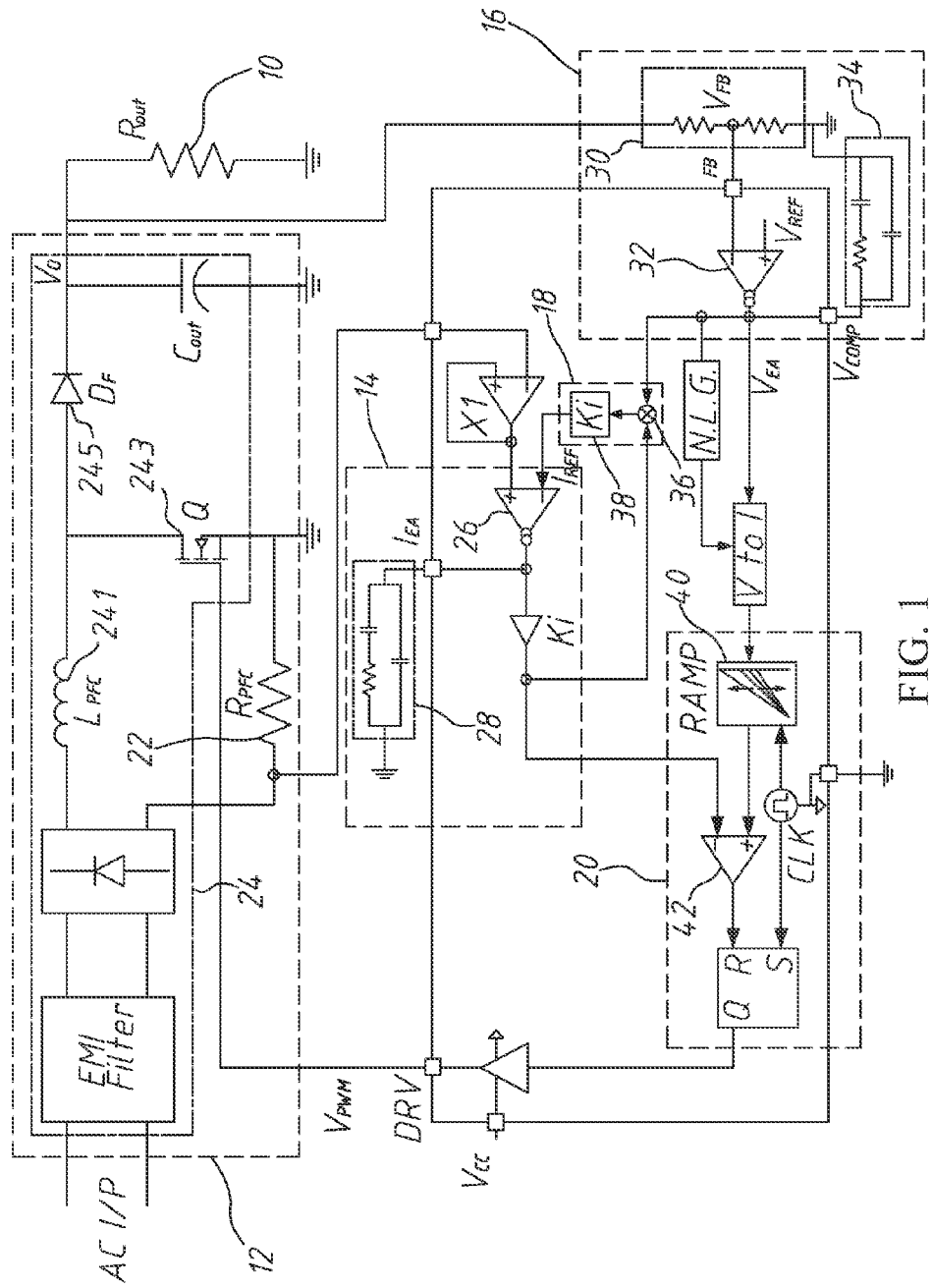
FIG. 1 is a circuit schematic diagram of the power correction device of the present invention.

As shown in FIG. 1, the power factor correction device of the invention includes a power stage circuit 12 connected to a load 10. The power stage circuit 12 receives an alternating-current (AC) voltage $V_{AC}$ and a pulse width modulation signal $V_{PWM}$, then, the alternating-current (AC) voltage $V_{AC}$ is converted into an input current $I_{AC}$ in accordance with the pulse width modulation signal $V_{PWM}$. The input current $I_{AC}$ is fed to the load 10 to generate an output voltage $V_o$ on the load 10. The input current $I_{AC}$ is also sampled as a correcting current $I_{sen}$. The power stage circuit 12 is connected to a current compensating circuit 14 and a voltage compensating circuit 16. The current compensating circuit 14 receives and compares the correcting current $I_{sen}$ with a reference current signal $I_{ref}$ to generate a compensating current signal $I_{EA}$. The voltage compensating circuit 16 receives and compares the output voltage $V_o$ with a reference voltage $V_{ref}$ to generate a compensating voltage signal $V_{EA}$. Both of the current compensating circuit 14 and the voltage compensating circuit 16 are connected to a multiplication amplified 8 and a pulse width modulation converter 20. The multiplication amplifier 18 receives and multiplies the compensating current signal $I_{EA}$ with the compensating voltage signal $V_{EA}$ to generate an updated reference current signal $I_{ref}$. The pulse width modulation converter 20 receives the compensating current signal $I_{EA}$ and the compensating voltage signal $V_{EA}$ to generate an updated pulse width modulation signal $V_{PWM}$, thus same phases of the alternating current voltage $V_{AC}$ and the input current $I_{AC}$ is obtained.

The power stage circuit 12 includes a sample resistor 22 and an alternating-current/direct-current (AC/DC) converter 24. The AC/DC converter 24 includes an inductor 241, a power transistor 243, and a power diode 245. The sample resistor 22 is connected to the current compensating circuit 14. The AC/DC converter 24 is connected to the load 10, the sample resistor 22, the current compensating circuit 14 and the voltage compensating circuit 16. The AC/DC converter 24 receives AC voltage $V_{AC}$ and pulse width modulation signal $V_{PWM}$, then the AC voltage $V_{AC}$ is converted into input current $I_{AC}$ in accordance with the pulse width modulation signal $V_{PWM}$ by inductor 241, power transistor 243, and power diode 245, thus the input current $I_{AC}$ is fed to the load to generate the output voltage Vo. Furthermore, the input current $I_{AC}$ is sampled by the sample resistor 22 to generate the correcting current $I_{sen}$.

The current compensating circuit 14 includes a current error amplifier 26 and a current compensator 28. The current error amplifier 26 connected to the sample resistor 22 of the power stage circuit 12 receives and compares the correcting current $I_{sen}$ and a reference current signal $I_{ref}$, thus generating a comparing current. The current compensator 28 connected to the current error amplifier 26 receives and compensates the comparing current to generate the compensating current signal $I_{EA}$. The voltage compensating circuit 16 comprises a voltage divider 30 that is connected to the AC/DC converter 24 of the power stage circuit 12, receives and divides the output voltage $V_o$ to generate a feedback voltage $V_{FB}$. The voltage divider 30 is connected to a voltage error amplifier 32 that receives and compares the feedback voltage $V_{FB}$ with a reference voltage $V_{ref}$ to generate a comparing voltage. The voltage error amplifier 32 is connected to a voltage compensator 34 that receives and compensates the comparing voltage thus generates a compensating voltage signal $V_{EA}$.

The multiplication amplifier 18 includes a multiplier 36 and a current gain regulator 38. The multiplier 36 is connected to the current compensator 28 of the current compensating circuit 14 and the voltage compensator 34 of the voltage compensating circuit 16 and receives the compensating current signal $I_{EA}$ and the compensating voltage signal $V_{EA}$ to generate a compensating feedback current by multiplying the compensating current signal $I_{EA}$ by the compensating voltage signal $V_{EA}$. The multiplier 36 is also connected to the current gain regulator 38 that receives the compensating feedback current and generates an updated reference current signal $I_{ref}$ by multiplying the compensating feedback current by a current gain $K_m$.

The pulse width modulation converter 20 includes a ramp generator 40 that is connected to the voltage error amplifier 32 of voltage compensating circuit 16 and receives the compensating voltage signal $V_{EA}$ to generate a ramp signal $V_{RAMP}$. Ramp generator 40 and current error amplifier 26 of the current compensating circuit 14 are connected to a conversion comparator 42 that receives and compares ramp signal $V_{RAMP}$ with compensating current signal $I_{EA}$ to generate an updated pulse width modulation signal $V_{PWM}$ that is fed into the AC/DC converter 24 of the power stage circuit 12. When the voltage value of the ramp signal $V_{RAMP}$ is higher than the corresponding voltage value of the compensating current signal $I_{EA}$, the updated pulse width modulation signal $V_{RAMP}$ is a high level voltage. Otherwise, when the voltage value of the ramp signal $V_{RAMP}$ is lower than the corresponding voltage value of the compensating current signal $I_{EA}$ the updated pulse width modulation signal $V_{PWM}$ is a low level voltage.

In order to obtain same phases of the input alternating current voltage and the input current, the sample resistance, the pulse width modulation signal $V_{PWM}$, the input current $I_{AC}$, the alternating current voltage $V_{AC}$, the output voltage $V_o$ and the ramp signal $V_{RAMP}$ have to be satisfied the following conditions:

$$R_S \cdot i_{in}(\theta) = d_{OFF}(\theta) \cdot T_{S.W.} \cdot S_V \tag{1}$$

$$d_{OFF}(\theta) = V_{in\_pk} \cdot \sin(\theta)/V_o = 1 - d(\theta) \tag{2}$$

$$i_{in}(\theta) = V_{in\_pk} \cdot \sin(\theta)/R_{in(ac)} \tag{3}$$

where:
$i_{in}(\theta)$ is the input current $I_{AC}$,
$V_{in\_pk} \cdot \sin(\theta)$ is the alternating current voltage $V_{AC}$,
$S_V$ is slope of the ramp signal $V_{RAMP}$,
$R_{in(ac)}$ is equivalent input alternating current resistance,
$T_{S.W.}$ and $d(\theta)$ are cycle and duty cycle of the pulse width modulation signal $V_{PWM}$ respectively.

Formulas (4) and (5) can be obtained from formulas (1), (2) and (3) as follows:

$$i_{in}(\theta) = \frac{V_{in\_pk}}{R_{in(ac)}} \cdot \sin(\theta) \quad (4)$$

$$R_{in(ac)} = \frac{R_S \cdot V_o}{T_{s.w.} \cdot S_V} \quad (5)$$

From formula (5), $R_{in(ac)}$ is a constant, therefore, the phases of the alternating current voltage and the input current are the same.

The input power $P_{in}$, the compensating current signal $I_{EA}$, the compensating voltage signal $V_{EA}$, the slope $S_V$ of the ramp signal $V_{RAMP}$, and a peak voltage $V_{pmax}$ of the ramp signal $V_{RAMP}$ are introduced as follows:

$$I_{AC} \cong \frac{2P_{in}}{V_{AC}} \quad (6)$$

$$V_{EA} \cong \frac{2P_{in} \cdot R_S \cdot V_o}{K_{multi} \cdot V_{AC}^2} \quad (7)$$

$$S_V \cong \frac{V_{EA} \cdot g_{mv}}{C_S} \cdot T_{S.W.} \quad (8)$$

$$I_{EA} \cong \frac{2P_{in} \cdot R_S \cdot g_{mv} \cdot T_{S.W.}}{K_{multi} \cdot V_{AC} \cdot C_S} \quad (9)$$

$$V_{pmax} \cong I_{EAmax} \frac{V_o}{V_{ACmin}} \quad (10)$$

Where:

$K_{multi}$ is multiplication gain of the multiplier 36, $g_{mv}$ is the gain of the voltage error amplifier 32, $C_s$ is a capacitance value of the interior capacitor of the ramp generator 40, $I_{EAmax}$ is the largest current value of the compensating current signal $I_{EA}$, and $V_{ACmin}$ is the smallest value of the alternating current voltage.

An updated reference current signal $I_{ref}$ is obtained by multiplying the compensating current signal $I_{EA}$ by the compensating voltage signal $V_{EA}$, as follows:

$$\frac{1}{Z_{comp}} \cdot \int_0^{\pi/2} \left( \frac{R_S \cdot i_{in}(\theta) - K_m \cdot}{\left( \frac{d_{OFF}(\theta) \cdot T_{S.W.} \cdot}{S_V \cdot V_o \cdot K_v} \right)} \right) d\theta = d_{OFF}(\theta) \cdot T_{S.W.} \cdot S_V$$

$$\Rightarrow i_{in}(\theta) = \frac{T_{S.W.} \cdot S_V}{R_S} \left[ K_m(d_{OFF}(\theta) \cdot V_o \cdot K_v) + Z_{comp} \cdot \frac{d}{d\theta} \cdot d_{OFF}(\theta) \right]$$

$$\Rightarrow i_{in}(\theta) = \frac{T_{S.W.} \cdot S_V}{R_S} \cdot \frac{V_{in\_pk}}{V_o} (K_m \cdot V_o \cdot K_v \cdot \sin(\theta) + Z_{comp} \cdot \cos(\theta))$$

$$\Rightarrow K_m \cdot V_o \cdot K_v \gg i_{in}(\theta) = \frac{T_{S.W.} \cdot S_V \cdot V_{in\_pk} \cdot K_m \cdot K_v}{R_S} \cdot \sin(\theta)$$

$$\Rightarrow i_{in}(\theta) = \frac{V_{in\_pk}}{R_{in(ac)}} \cdot \sin(\theta)$$

$$\Rightarrow R_{in(ac)} = \frac{R_S}{T_{s.w.} \cdot S_V \cdot K_m \cdot K_v}$$

Where:

$K_V$ is a voltage division proportion of the voltage divider 30, and $Z_{comp}$ is impedance of the current compensator 28.

In this invention, a sample of the input voltage is not required and the compensating current signal $I_{EA}$ and the compensating voltage signal $V_{EA}$ are used to acquire an updated reference current signal $I_{ref}$ to achieve the correction of the power factor. The method of the invention can avoid the use of an integrated capacitor, as such the response speed of the internal circuit is greatly increased during operation to improve the power correction efficiency.

Figure 2:
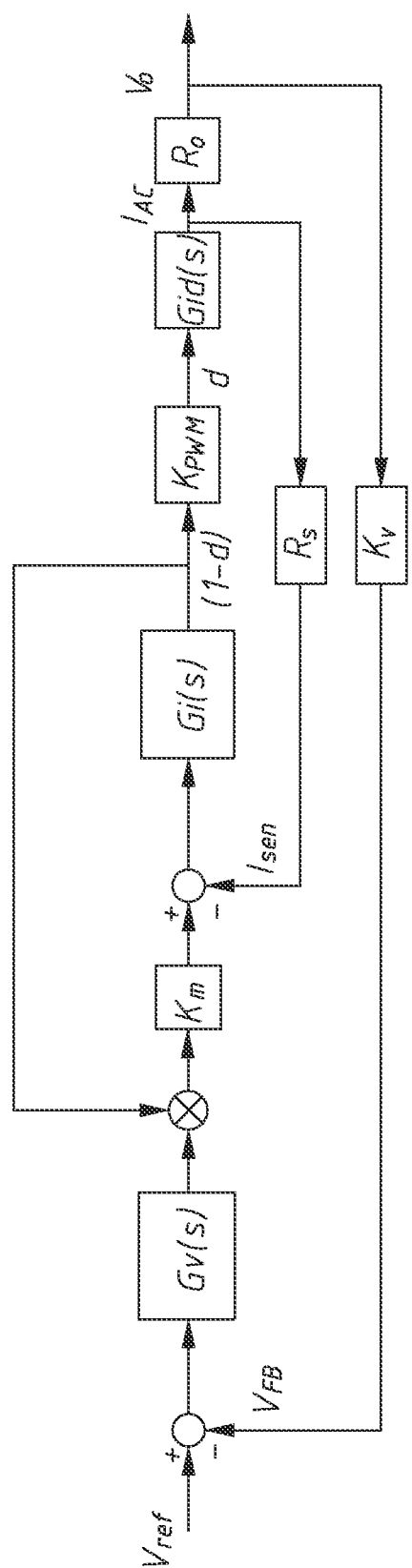
FIG. 2 is a block diagram for the transfer function of the power correction device of the present invention.
Figure 3:
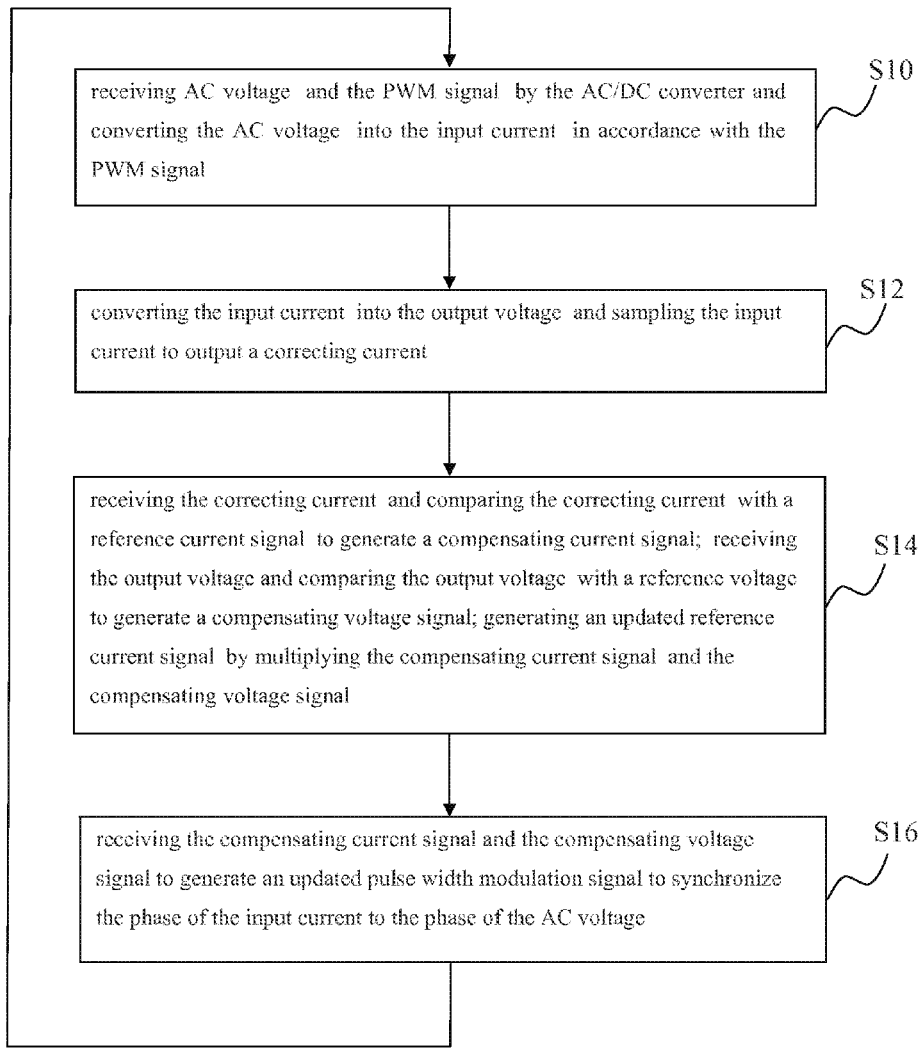
FIG. 3 is a flow diagram of the correcting method of the present invention.

FIG. 2 and FIG. 3 describe a correcting method of the invention. As shown in FIG. 2, $G_{v(s)}$ is a transfer function of the voltage compensator 34, $G_{i(s)}$ is the transfer function of the current compensator 28, $G_{id(s)}$ is the transfer function of the AC/DC converter 24, and $K_{PWM}$ is the transfer function of the pulse width modulation converter 20. As shown in step S10, the AC/DC converter 24 of the power level circuit 12 receives the input alternating current voltage $V_{AC}$ and the pulse width modulation signal $V_{PWM}$, then converts the alternating current voltage $V_{AC}$ into the input current $I_{AC}$ in accordance with the pulse width modulation signal $V_{PWM}$. As shown in step S12, the input current $I_{AC}$ is converted into the output voltage $V_o$ by the AC/DC converter 24 of the power stage circuit 12, and the input current $I_{AC}$ is also sampled via the sample resistor 22 as a correcting current $I_{sen}$. As shown in step S14, the current compensating circuit 14 receives the correcting current $I_{sen}$ that is compared to a reference current signal $I_{ref}$ via the current compensating circuit 14 to generate the compensating current signal $I_{EA}$. Specifically, the current error amplifier 26 receives and compares the correcting current $I_{sen}$ with the reference current signal $I_{ref}$ thus generates a comparing current. Then, the current compensator 28 receives and compensates the comparing current thus generates the compensating current signal $I_{EA}$.

The voltage compensating circuit 16 receives the output voltage $V_o$ that is compared with a reference voltage $V_{ref}$ via the voltage compensating circuit 16 to generate the compensating voltage signal $V_{EA}$. Specifically, the voltage divider 30 receives the output voltage $V_o$ to generate one feedback voltage. Then, the voltage error amplifier 32 receives and compares the feedback voltage with a reference voltage $V_{ref}$ to generate the comparing voltage. Finally, the voltage compensator 34 receives and compensates the comparing voltage thus generates the compensating voltage signal $V_{EA}$.

An updated reference current signal $I_{ref}$ is obtained by multiplying the compensating current signal $I_{EA}$ by the compensating voltage signal $V_{EA}$ by the multiplication amplifier 18. Specifically, the multiplier 36 receives the compensating current signal $I_{EA}$ and the compensating voltage signal $V_{EA}$ to generate the compensating feedback current by multiplying the compensating current signal $I_{EA}$ by the compensating voltage signal $V_{EA}$, then the current gain regulator 38 receives the compensating feedback current that is multiplied by the current gain $K_m$ to generate the reference current signal $I_{ref}$.

Finally, as shown in step S16, the pulse width modulation converter 20 receives the compensating current signal $I_{EA}$ and the compensating voltage signal $V_{EA}$ to generate the updated pulse width modulation signal $V_{PWM}$ that is transmitted into the power stage circuit 12. Specifically, the ramp generator 40 receives the compensating voltage signal $V_{EA}$ to generate ramp signal $V_{RAMP}$, then, conversion comparator 42 receives and compares the ramp signal $V_{RAMP}$ and compensating current signal $I_{EA}$ thus generates the updated pulse width modulation signal $V_{PWM}$ that is fed to the power stage circuit 12, thus returning back to step S10. The whole process of steps S10 to S16 is repeated to achieve the phase synchronization for the alternating current voltage and the input current.

Figure 4:
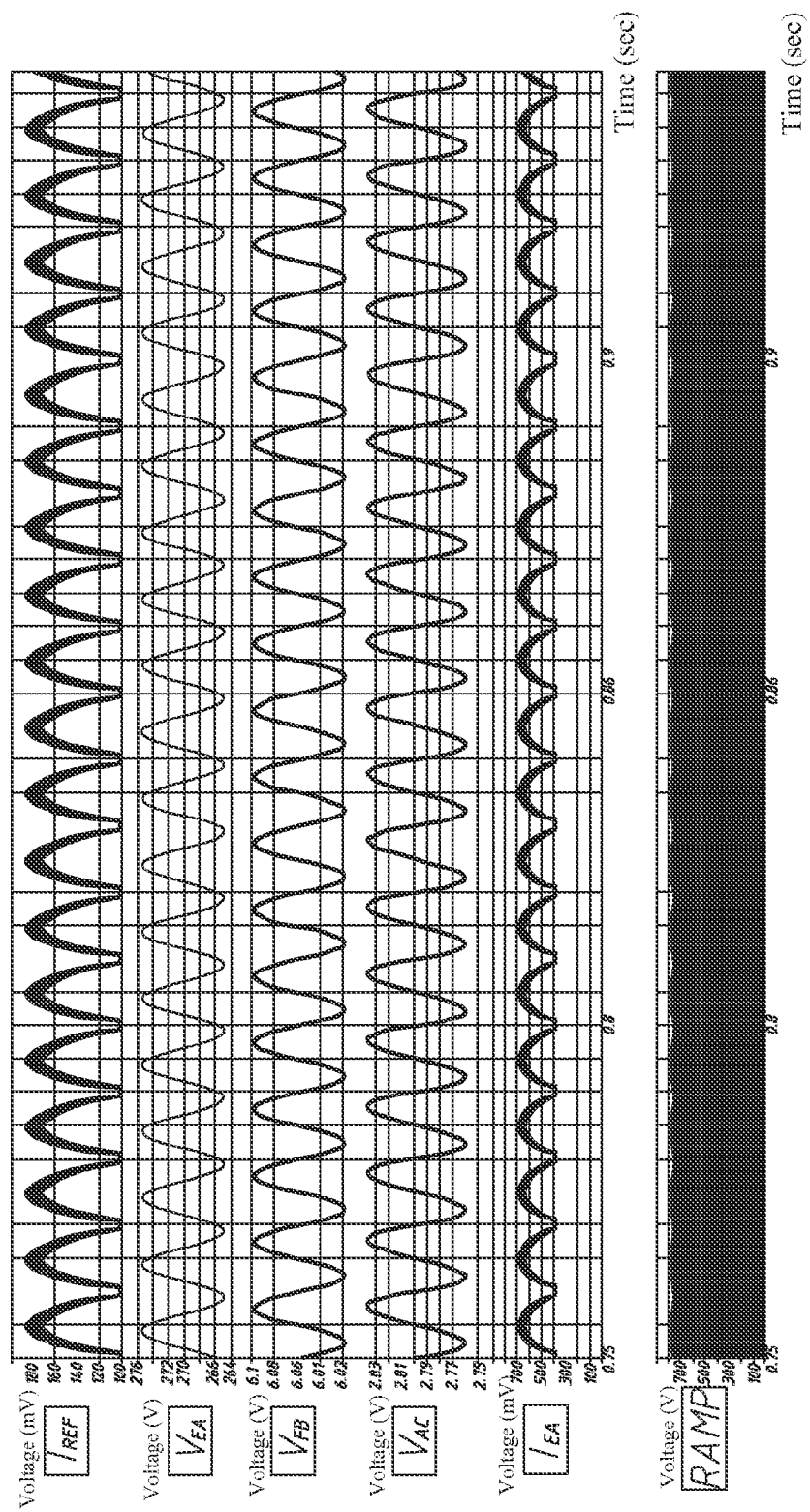
FIG. 4 is a waveform diagram of all received and generated signals in power correction device of the present invention.
Figure 5:
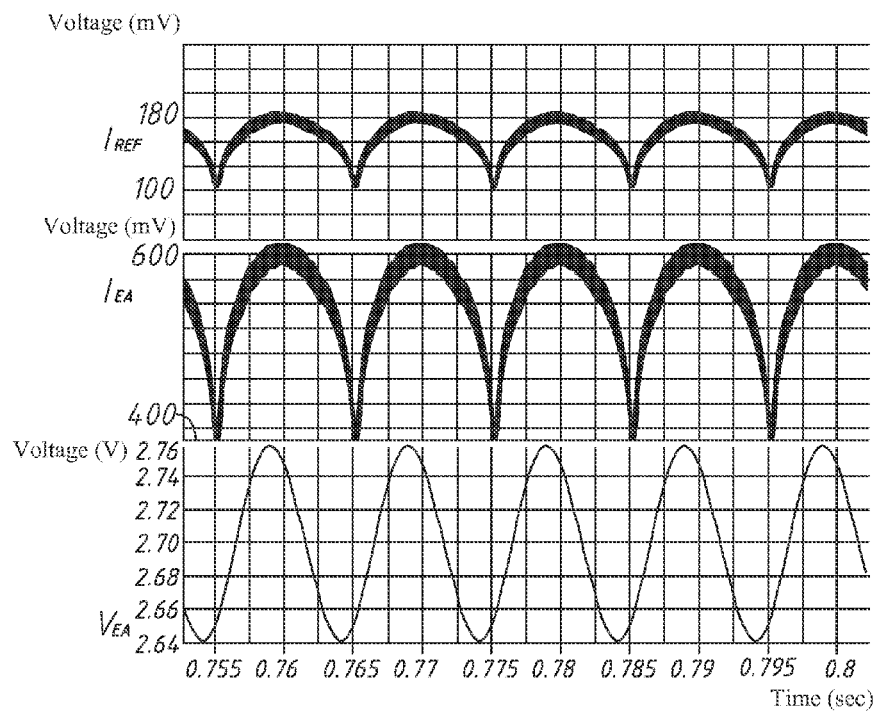
FIG. 5 is an amplified waveform diagram of the reference current signal, the compensating current signal and the compensating voltage signal of FIG. 4.

FIG. 4 shows the waveforms of the reference current signal $I_{ref}$, compensating voltage signal $V_{EA}$, feedback voltage $V_{FB}$, alternating current voltage $V_{AC}$, compensating current signal $I_{EA}$ and ramp signal $V_{RAMP}$. FIG. 5 shows corresponding reference current signal $I_{ref}$, compensating current signal $I_{EA}$ and compensating voltage signal $V_{EA}$ of FIG. 4 after amplifying.

Figure 6:
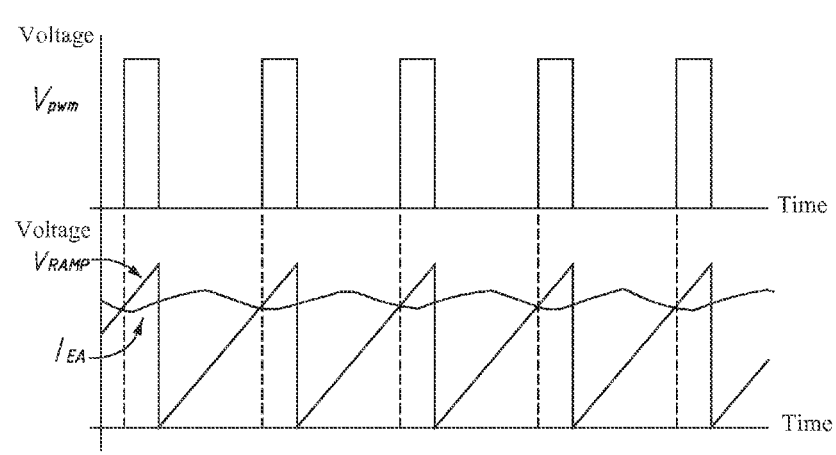
FIG. 6 is a waveform diagram of the ramp signal, the compensating current signal and the pulse width modulation signal.

In conversion process of the conversion comparator 42, when the voltage value of the ramp signal $V_{RAMP}$ is higher than the corresponding voltage value of the compensating current signal $I_{EA}$, the updated pulse width modulation signal $V_{PWM}$ is a high level voltage. Otherwise, when the voltage value of the ramp signal $V_{RAMP}$ is lower than the corresponding voltage value of the compensating current signal $I_{EA}$, the updated pulse width modulation signal $V_{PWM}$ is a low level voltage, as shown in FIG. 6.

Figure 7:
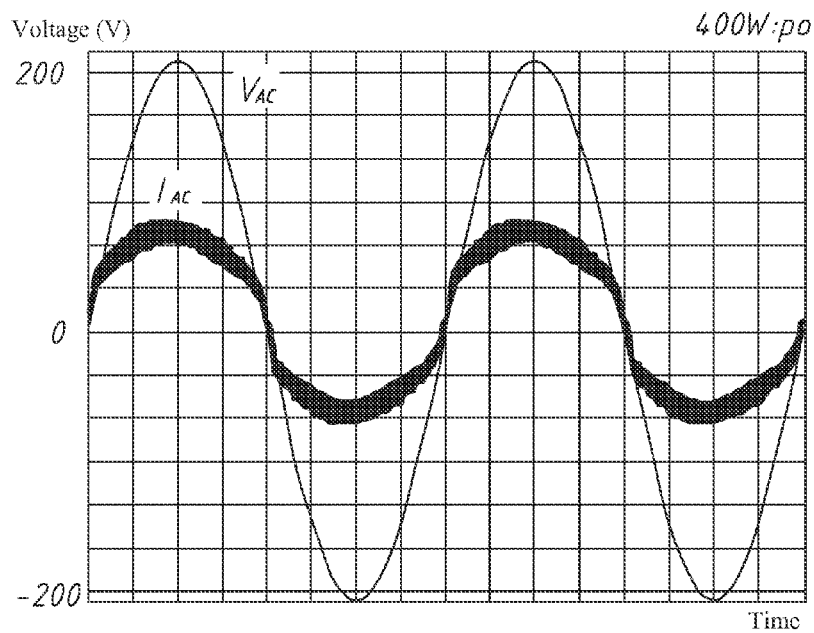
FIG. 7 is a waveform diagram of the 220V alternating current voltage and its input current achieved by the power correction device of the present invention.
Figure 8:
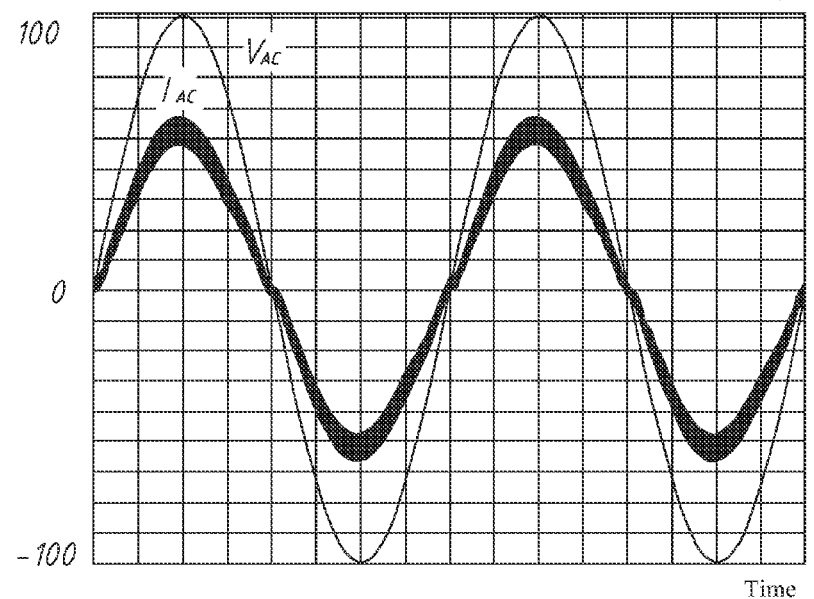
FIG. 8 is a waveform diagram of the 110V alternating current voltage and its input current achieved by power correction device of the present invention.

FIG. 7 shows the waveforms of 220V alternating current voltage $V_{AC}$ and its input current $I_{AC}$ and FIG. 8 shows the waveforms of 110V alternating current voltage $V_{AC}$ and its input current $I_{AC}$, which are achieved by the correction device of the present invention. As shown in these figures, the phases of the alternating current voltage $V_{AC}$ and its input current are the same, as such the purpose of power factor correction is achieved.

The present invention uses only one multiplication amplifier to receive compensating current signal and compensating voltage signal to generate the updated reference current signal that is provided to the current compensating circuit for correcting the power factor of the input signal.

The above is only one better embodiment of the invention, which is not used for limiting the scope of implementation of the invention. Therefore, equivalent changes and decorations caused by the shapes, configurations, characteristics and spirits in the scope of application for patent in the invention are all contained in the scope of the application for patent in the invention.

The invention claimed is:

1. A power factor correction device comprising:
a current compensating circuit comprising a current error amplifier, wherein the current error amplifier receives and compares a correcting current with a reference current signal, thereby generating a compensating current signal;
a voltage compensating circuit receiving and comparing a first output voltage with a reference voltage, thereby generating a compensating voltage signal;
a multiplication amplifier connected to the current compensating circuit and the voltage compensating circuit, the multiplication amplifier receiving the compensating current signal and the compensating voltage signal, thereby generating an updated reference current signal provided to the current compensating circuit.

2. The power factor correction device of claim 1, wherein the multiplication amplifier generates the updated reference current signal by multiplying the compensating current signal with the compensating voltage signal.

3. The power factor correction device of claim 1, further comprising a power stage circuit connecting to a load receiving an alternating current voltage and a control signal, wherein the power stage circuit converts the alternating current voltage into an input current in accordance with the control signal and outputs the input current to the load to generate a second output voltage on the load, and wherein the power stage circuit samples the input current to output the correcting current to the current error amplifier connected to the power stage circuit.

4. The power factor correction device of claim 3, wherein the power stage circuit further comprises a sample resistor connected to the current compensating circuit, and an AC/DC converter connected to the current compensating circuit, the load, the sample resistor, and the voltage compensating circuit, wherein the AC/DC converter receives the alternating current voltage and the control signal, wherein the AC/DC converter converts the alternating current voltage into the input current in accordance with the control signal and feeds the input current to the load to generate the second output voltage; and wherein the sample resistor samples the input current for the AC/DC converter to output the correcting current.

5. The power factor correction device of claim 3, wherein the current compensating circuit further comprises a current compensator connected to the current error amplifier, wherein the current error amplifier receives and compares the correcting current with the reference current signal to generate a comparing current, and wherein the current compensator receives the comparing current to generate the compensating current signal.

6. The power factor correction device of claim 3, wherein the voltage compensating circuit further comprises a voltage divider connected to the power stage circuit, a voltage error amplifier connected to the voltage divider and a voltage compensator connected to the voltage error amplifier, wherein the voltage divider receives the second output voltage and generates a feedback voltage, wherein the voltage error amplifier receives and compares the feedback voltage with another reference voltage to generate a comparing voltage; and wherein the voltage compensator receives the comparing voltage to generate another compensating voltage signal.

7. The power factor correction device of claim 1, wherein the multiplication amplifier further comprises a multiplier connected to the current compensating circuit and the voltage compensating circuit and a current gain regulator connected to the multiplier, wherein the multiplier receives and multiples the compensating current signal and the compensating voltage signal to generate a compensating feedback current; and wherein the current gain regulator receives and multiples the compensating feedback current with a current gain to generate the reference current signal.

8. The power factor correction device of claim 1, further comprising a converter connected to the current compensating circuit and the voltage compensating circuit, the converter receiving the compensating current signal and the compensating voltage signal to generate a control signal to synchronize a phase of an alternating current voltage and an input current.

9. The power factor correction device of claim 8, wherein the converter further comprises a ramp generator connected to the voltage compensating circuit and a conversion comparator connected to the ramp generator and the current compensating circuit, wherein the ramp generator receives the compensating voltage signal to generate a ramp signal; and wherein the conversion comparator receives and compares the ramp signal and the compensating current signal to output the control signal to a power stage circuit.

10. The power factor correction device of claim 9, wherein whenever a voltage value of the ramp signal is higher than a corresponding voltage value of the compensating current signal, the control signal is a high level voltage, and whenever the voltage value of the ramp signal is lower than the corresponding voltage value of the compensating current signal, the control signal is a low level voltage.

11. A power factor correcting method comprising the following steps:
- receiving an alternating current voltage and a control signal so as to convert the alternating current voltage into an input current according to the control signal;
- converting the input current into an output voltage and sampling the input current to output a correcting current;
- comparing the correcting current with a reference current signal to generate a compensating current signal,
- comparing the output voltage with a reference voltage to generate a compensating voltage signal;
- multiplying the compensating current signal by the compensating voltage signal to generate an updated reference current signal; and
- receiving the compensating current signal and the compensating voltage signal to generate an updated control signal.

12. The power factor correcting method of claim 11, wherein the step of comparing the correcting current with the reference current signal to generate the compensating current signal further comprises the following sub-steps: receiving the correcting current and the reference current signal, outputting a comparing current after comparing the correcting current with the reference current signal; and receiving the comparing current to generate the compensating current signal after performing current compensation.

13. The power factor correcting method of claim 11, wherein the step of comparing the output voltage with the reference voltage to generate the compensating voltage signal further comprises the following sub-steps: receiving the output voltage for voltage division to generate a feedback voltage; receiving the feedback voltage and the reference voltage, outputting a comparing voltage after comparing the feedback voltage with the reference voltage; and receiving the comparing voltage to generate the compensating voltage signal after performing voltage compensation.

14. The power factor correcting method of claim 11, wherein the step of multiplying the compensating current signal by the compensating voltage signal to generate the updated reference current signal further comprises the following sub-steps:
- receiving the compensating current signal and the compensating voltage signal to generate a compensating feedback current after multiplying the compensating current signal by the compensating voltage signal; and
- receiving the compensating feedback current and multiplying with a current gain to generate the reference current signal.

15. The power factor correcting method of claim 11, wherein the step of receiving the compensating current signal and the compensating voltage signal to generate the control signal further comprises the following sub-steps: receiving the compensating voltage signal to generate a ramp signal; and receiving the ramp signal and the compensating current signal to output the updated control signal after comparing the ramp signal with the compensating current signal.

16. The power factor correcting method of claim 15, wherein whenever a voltage value of the ramp signal is higher than a corresponding voltage value of the compensating current signal, the updated control signal is a high level voltage; and whenever the voltage value of the ramp signal is lower than the corresponding voltage value of the compensating current signal, the updated control signal is a low level voltage.

17. The power factor correcting method of claim 15, wherein a sample resistor samples the input current to provide the correcting current.

18. The power factor correcting method of claim 17, wherein the control signal comprises a pulse width modulation signal.

19. A power factor correcting method comprising the following steps:
- receiving an alternating current voltage and a control signal, so as to convert the alternating current voltage into an input current according to the control signal, wherein the control signal comprising a pulse width modulation signal;
- converting the input current into an output voltage, and sampling the input current to output a correcting current, wherein a sample resistor samples the input current to provide the correcting current;
- comparing the correcting current with a reference current signal to generate a compensating current signal,
- comparing the output voltage with a reference voltage to generate a compensating voltage signal;
- multiplying the compensating current signal by the compensating voltage signal to generate an updated reference current signal; and
- receiving the compensating current signal and the compensating voltage signal to generate an updated control signal, wherein the step of receiving the compensating current signal and the compensating voltage signal to generate the updated control signal further comprises the following steps:
  - receiving the compensating voltage signal to generate a ramp signal; and
  - receiving the ramp signal and the compensating current signal to output the updated control signal after comparing the ramp signal with the compensating current signal;
- wherein the sample resistor, the pulse width modulation signal, the input current, the alternating current voltage, the output voltage and the ramp signal satisfy the following conditions:

$$R_S \cdot i_{in}(\theta) = d_{OFF}(\theta) \cdot T_{SW} \cdot S_V$$

$$d_{OFF}(\theta) = V_{in\_pk} \cdot \sin(\theta)/V_o = 1 - d(\theta); \text{ and}$$

$$i_{in}(\theta) = V_{in\_pk} \cdot \sin(\theta)/R_{in(ac)},$$

wherein $R_s$ is a resistance value of the sample resistor, $i_{in}(\theta)$ is the input current, $V_{in\_pk} \sin(\theta)$ is the alternating current voltage, $V_o$ is the output voltage, $S_v$ is a slope of the ramp signal, $R_{in(ac)}$ is an equivalent input alternating current resistance, $T_{sw}$ and $d(\theta)$ are cycle and duty cycle of the pulse width modulation signal $V_{PWM}$ respectively.

* * * * *